(12) United States Patent
Hu et al.

(10) Patent No.: US 8,538,951 B2
(45) Date of Patent: *Sep. 17, 2013

(54) SEARCH SERVER INTERCONNECTION METHOD, SEARCH SERVER AND SYSTEM FOR MOBILE SEARCH

(75) Inventors: Hanqiang Hu, Shenzhen (CN); Chong Gu, Shenzhen (CN); Jiangtao Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,623

(22) Filed: Feb. 17, 2012

(65) Prior Publication Data

US 2012/0150840 A1    Jun. 14, 2012

Related U.S. Application Data

(63) Continuation of application No. PCT/CN2010/076088, filed on Aug. 18, 2010.

(30) Foreign Application Priority Data

Aug. 20, 2009   (CN) .......................... 2009 1 0168444

(51) Int. Cl.
*G06F 7/00* (2006.01)
(52) U.S. Cl.
USPC ........................................................ 707/711
(58) Field of Classification Search
USPC ........................................................ 707/711
See application file for complete search history.

(56) References Cited

U.S. PATENT DOCUMENTS

| 7,680,860 B1 * | 3/2010 | Fordham ...................... 707/741 |
| 7,930,286 B2 | 4/2011 | Sue |
| 2005/0192946 A1 | 9/2005 | Lu et al. |
| 2006/0010204 A1 | 1/2006 | Jalava et al. |
| 2006/0288001 A1 * | 12/2006 | Costa et al. ...................... 707/5 |
| 2007/0038603 A1 * | 2/2007 | Guha ............................... 707/3 |
| 2011/0173192 A1 | 7/2011 | Hu |

FOREIGN PATENT DOCUMENTS

| CN | 1731396 A | 2/2006 |
| CN | 1731400 A | 2/2006 |
| CN | 1981506 A | 6/2007 |

(Continued)

OTHER PUBLICATIONS

Written Opinion of the International Searching Authority issued in corresponding PCT Patent Application No. PCT/CN2010/076088, mailed Dec. 2, 2010.

(Continued)

*Primary Examiner* — Jensen Hu
(74) *Attorney, Agent, or Firm* — Brinks Hofer Gilson & Lione

(57) ABSTRACT

A search server interconnection method, a search server, and a system for mobile search are disclosed The method includes: sending an information list of a first group of member engines to a search server; receiving an information list of a second group of member engines, where the information list of the second group of member engines is returned by the search server; and sending meta-index information of member engines in the information list of the second group of member engines to the search server. In the present invention, an effective mobile search service across search servers is realized.

20 Claims, 6 Drawing Sheets

(56) References Cited

FOREIGN PATENT DOCUMENTS

| WO | WO 2008/092039 A1 | 7/2008 |
|---|---|---|
| WO | WO 2008/137296 A1 | 11/2008 |
| WO | WO 2011/020430 A1 | 2/2011 |

OTHER PUBLICATIONS

Chinese Patent No. 101996211, issued on Jan. 23, 2013, granted in corresponding Chinese Patent Application No. 200910168444.5.

He Xiumiao, "Mobile Search Technologies and Services" Modern Science & Technology of Telecommunications, Sep. 2008.

Open Mobile Alliance, Mobile Search Framework Architecture, Draft Version 1.0—Aug. 14, 2009, with edits.

Open Mobile Alliance, Mobile Search Framework Architecture, Draft Version 1.0—Aug. 14, 2009.

Notice of Allowance issued in commonly owned U.S. Appl. No. 13/494,552, mailed Feb. 22, 2013.

\* cited by examiner

SEARCH SERVER INTERCONNECTION METHOD, SEARCH SERVER AND SYSTEM FOR MOBILE SEARCH

CROSS-REFERENCE TO RELATED APPLICATIONS

This application is a continuation of International Application No. PCT/CN2010/076088, filed on Aug. 18, 2010, which claims priority to Chinese Patent Application No. 200910168444.5, filed on Aug. 20, 2009, both of which are hereby incorporated by reference in their entireties.

FIELD OF THE INVENTION

The present invention relates to the field of mobile search, and in particular, to a search server interconnection method, a search server, and a system for mobile search.

BACKGROUND OF THE INVENTION

With the development of communication technologies, a new technology that combines two hot fields of a search engine and mobile communication, that is, a mobile search technology emerges currently. As a mobile value-added service, an operator begins to provide a mobile search service for mobile subscribers by using the mobile search technology. Mobile search has a quite important technology highlight, that is, precise search, which is capable of providing a customized search service to each subscriber, that is, what is searched for by a subscriber is what is obtained by the subscriber.

A mobile search framework is a platform that is based on meta-search, which integrates capabilities of many professional/vertical search engines, and provides a brand-new and comprehensive search platform for subscribers. In the mobile search framework, each operator has its own Mobile Search Server (MSS), and each search server administrates one or more member engines. A member engine, that is, a search engine, provides a real search service for subscribers, the member engine is generally described with a meta-index, and the meta-index includes some information used for reflecting characteristics of the member engine. Member engines administrated by search servers of different operators may be different, and the same member engine may also register with search servers of different operators respectively. An operator provides a mobile search service to subscribers through a member engine.

Currently, an Open Mobile Alliance (OMA) standard defines an interconnection interface, that is, an MSF-4 interface, between search servers of different operators in a mobile search framework. The interface includes an interface for exchanging a meta-index between an MSS and a Foreign MSS (a search server of another operator), and an interface for searching for a request and a response result.

In the implementation of the present invention, the inventor finds that the prior art has at least the following disadvantages.

Currently, the OMA does not design a technical solution for how to specifically implement exchanging of meta-search between an MSS and a Foreign MSS through the MSF-4 interface. How to realize interconnection between search servers of different operators, for example, interconnection between an MSS of China Mobile and an MSS of China Telecom, is an important problem to be solved.

SUMMARY OF THE INVENTION

In order to solve the problems in the prior art, embodiments of the present invention provide a search server interconnection method, a search server, and a system for mobile search. The technical solutions are as follows.

A search server interconnection method for mobile search includes:

sending an information list of a first group of member engines to a search server;

receiving an information list of a second group of member engines, where the information list of the second group of member engines is returned by the search server, and the information list of the second group of member engines is obtained after the search server determines, according to the information list of the first group of member engines, member engines that are to exchange information; and sending meta-index information of member engines in the information list of the second group of member engines to the search server.

A search server interconnection method for mobile search includes:

receiving an information list of a first group of member engines, where the information list of the first group of member engines is sent by a search server;

determining, according to the information list of the first group of member engines, member engines that are to exchange information, obtaining an information list of a second group of member engines, and returning the information list of the second group of member engines to the search server; and receiving meta-index information of member engines in the information list of the second group of member engines, where the information list of the second group of member engines is returned by the search server.

A search server for mobile search includes:

a first sending module, configured to send an information list of a first group of member engines to a search server of a requested party;

a receiving module, configured to receive an information list of a second group of member engines, where the information list of the second group of member engines is returned by the search server of the requested party, and the information list of the second group of member engines is obtained after the search server of the requested party determines, according to the information list of the first group of member engines, member engines that are to exchange information; and a second sending module, configured to send meta-index information of member engines in the information list of the second group of member engines to the search server of the requested party, where the information list of the second group of member engines is received by the receiving module.

A search server for mobile search includes:

a first receiving module, configured to receive an information list of a first group of member engines, where the information list of the first group of member engines is sent by a search server of a requesting party;

a determining and sending module, configured to determine, according to the information list of the first group of member engines, member engines that are to exchange information, where the information list of the first group of member engines is received by the first receiving module; obtain an information list of a second group of member engines; and send the information list of the second group of member engines to the search server of the requesting party; and a second receiving module, configured to receive meta-index information of member engines in the information list of the second group of member engines, where the information list of the second group of member engines is returned by the search server of the requesting party.

A system for mobile search includes a search server of a requesting party and a search server of a requested party;

the search server of the requesting party is configured to send an information list of a first group of member engines to the search server of the requested party; receive an information list of a second group of member engines, where the information list of the second group of member engines is returned by the search server of the requested party; and send meta-index information of member engines in the information list of the second group of member engines to the search server of the requested party; and the search server of the requested party is configured to receive the information list of the first group of member engines, where the information list of the first group of member engines is sent by the search server of the requesting party; determine, according to the information list of the first group of member engines, member engines that are to exchange information; obtain the information list of the second group of member engines; return the information list of the second group of member engines to the search server of the requesting party; and receive meta-index information of member engines in the information list of the second group of member engines, where the information list of the second group of member engines is returned by the search server of the requesting party.

In the technical solutions provided in the embodiments of the present invention, through meta-index information exchange of member engines between search servers, an effective mobile search service across the search servers is implemented, and meta-index information of a determined member engine is transferred between the search servers, which greatly reduces a workload and a network bandwidth of the search servers.

DETAILED DESCRIPTION OF THE EMBODIMENTS

To make the technical solutions, objectives and merits of the present invention clearer, the embodiments of the present invention are described in further detail with reference to the accompanying drawings.

Figure 1:
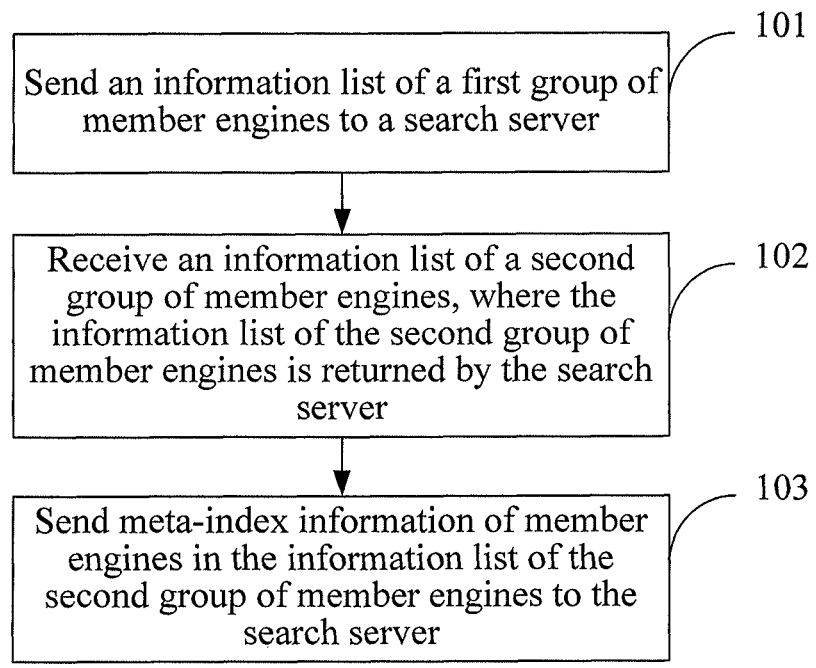
FIG. 1 is a flow chart of a search server interconnection method for mobile search according to an embodiment of the present invention.

Referring to FIG. 1, this embodiment provides a search server interconnection method for mobile search, which includes:

101: sending an information list of a first group of member engines to a search server;

102: receiving an information list of a second group of member engines, where the information list of the second group of member engines is returned by the search server, and the information list of the second group of member engines is obtained after the search server determines, according to the information list of the first group of member engines, member engines that are to exchange information; and 103: sending meta-index information of member engines in the information list of the second group of member engines to the search server.

The search server in this embodiment is a search server of a requested party, and is interconnected with a search server of a requesting party. The preceding procedure may be a procedure in which the search server of the requesting party registers meta-index information with the search server of the requested party, and may also be a procedure in which the search server of the requesting party updates meta-index information to the search server of the requested party. Through meta-index information exchange of member engines between search servers, an effective mobile search service across the search servers is implemented, and meta-index information of a determined member engine is transferred between the search servers, which greatly reduces a workload and a network bandwidth of the search servers.

Figure 2:
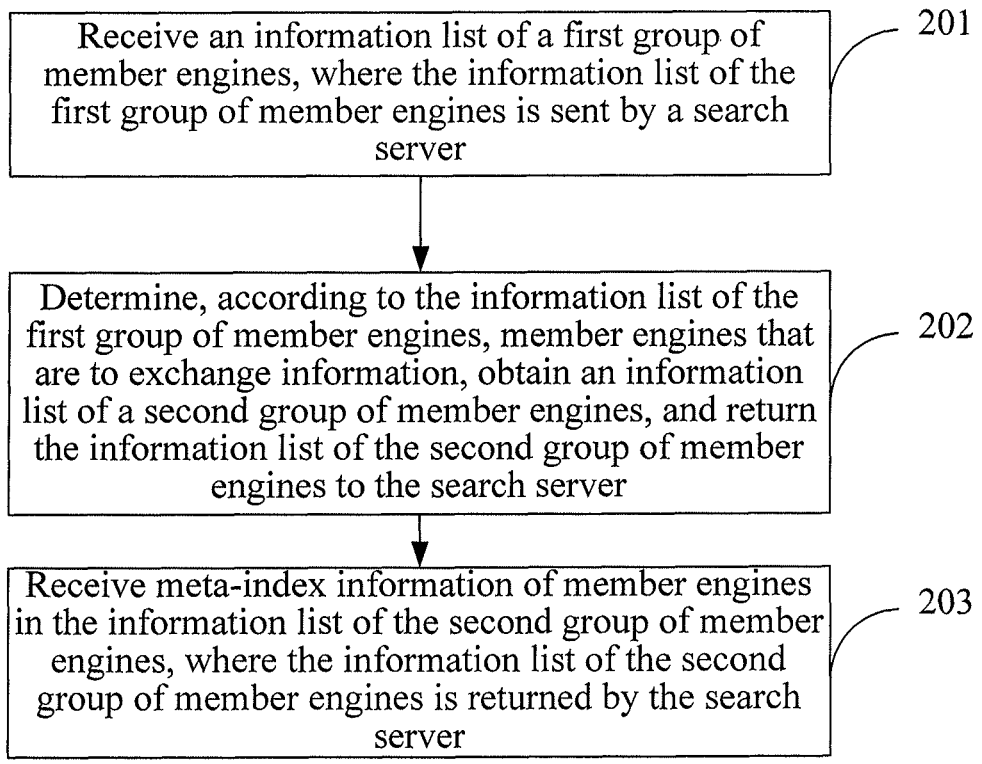
FIG. 2 is another flow chart of a search server interconnection method for mobile search according to an embodiment of the present invention.

Referring to FIG. 2, this embodiment provides a search server interconnection method for mobile search, which includes:

201: receiving an information list of a first group of member engines, where the information list of the first group of member engines is sent by a search server;

202: determining, according to the information list of the first group of member engines, member engines that are to exchange information, obtaining an information list of a second group of member engines, and returning the information list of the second group of member engines to the search server; and 203: receiving meta-index information of member engines in the information list of the second group of member engines, where the information list of the second group of member engines is returned by the search server.

The search server in this embodiment is a search server of a requesting party, and is interconnected with a search server of a requested party. The preceding procedure may be a procedure in which the search server of the requesting party registers meta-index information with the search server of the requested party, and may also be a procedure in which the search server of the requesting party updates meta-index information to the search server of the requested party. Through meta-index information exchange of member engines between search servers, an effective mobile search service across the search servers is implemented, and meta-index information of determined member engines is transferred between the search servers, which greatly reduces a workload and a network bandwidth of the search servers.

The registration involved in this embodiment of the present invention refers to that the search server of the requesting party requests the search server of the requested party to store meta-index information of member engines for the first time. The update involved in this embodiment of the present invention refers to that after the registration is completed, a database of a member engine may be updated at any time, and as a result, meta-index information of the member engine is also changed at any time, so that the search server of the requesting party requests the search server of the requested party to update the meta-index information of the member engines again.

The meta-index information involved in this embodiment of the present invention refers to information used for describing a member engine, or information used for describing contents included by a database that is corresponding to the member engine. Meta-index information may be applicable to a member engine or a corresponding database in meta-search. The meta-index information includes at least one type of the following information:

a maximum normalized weight of a term, a sum of word frequencies of a term, a document frequency of a term, the number of values within a value interval of a numerical value-type parameter, and a document frequency of a value of an enumeration-type parameter.

The term is any term in a database corresponding to a member engine to which the meta-index information belongs, and both the numerical value-type parameter and the enumeration-type parameter are parameters in the database corresponding to the member engine to which the meta-index information belongs. Meanings of the various types of information are respectively introduced in the following.

1) Maximum normalized weight of a term

For each document in a database that is corresponding to a member engine, a normalized weight of the document relative to a term ti is calculated, and specifically, may be calculated and obtained by dividing occurrence times (that is, a word frequency) of the term ti in the document in the database by the length of the document, and the formula is as follows:

the normalized weight of the term ti in the document=$TF_i/|d|$, where $TF_i$ is the word frequency of the term ti, $|d|$ is the length of the document, and $|d|=\sqrt{tf1^2+tf2^2+...+tfn^2}$ (tf1 to tfn are word frequencies of all terms of the document).

A maximum normalized weight of a term refers to taking a maximum value of all normalized weights obtained through calculation, and obtaining a maximum normalized weight of the term ti.

2) Sum of word frequencies of a term

For each document in a database that is corresponding to a member engine, a word frequency of the document relative to a term ti is calculated, and all obtained word frequencies are added to obtain the sum of word frequencies of the term.

3) Document frequency of a term

A document frequency of a term refers to the number of documents including a term ti in a database that is corresponding to a member engine.

4) The number of values within a value interval of a numerical value-type parameter For all numerical value-type parameters in a database that is corresponding to a member engine, the number of values within the value interval of each numerical value-type parameter is calculated, and generally the value interval is uniformly specified by a mobile search operator.

5) Document frequency of a value of an enumeration-type parameter

A document frequency of a value of an enumeration-type parameter refers to the number of documents including the enumeration-type parameter in a database that is corresponding to a member engine.

In this embodiment of the present invention, any one or more types of the five parameters may be adopted as meta-index information, and when a parameter used for expressing the meta-index information is selected, each member engine in a mobile search system expresses the meta-index information with the same parameter. For example, all member engines express the meta-index information with a document frequency of a term, or express the meta-index information with a maximum normalized weight of a term.

Figure 3:
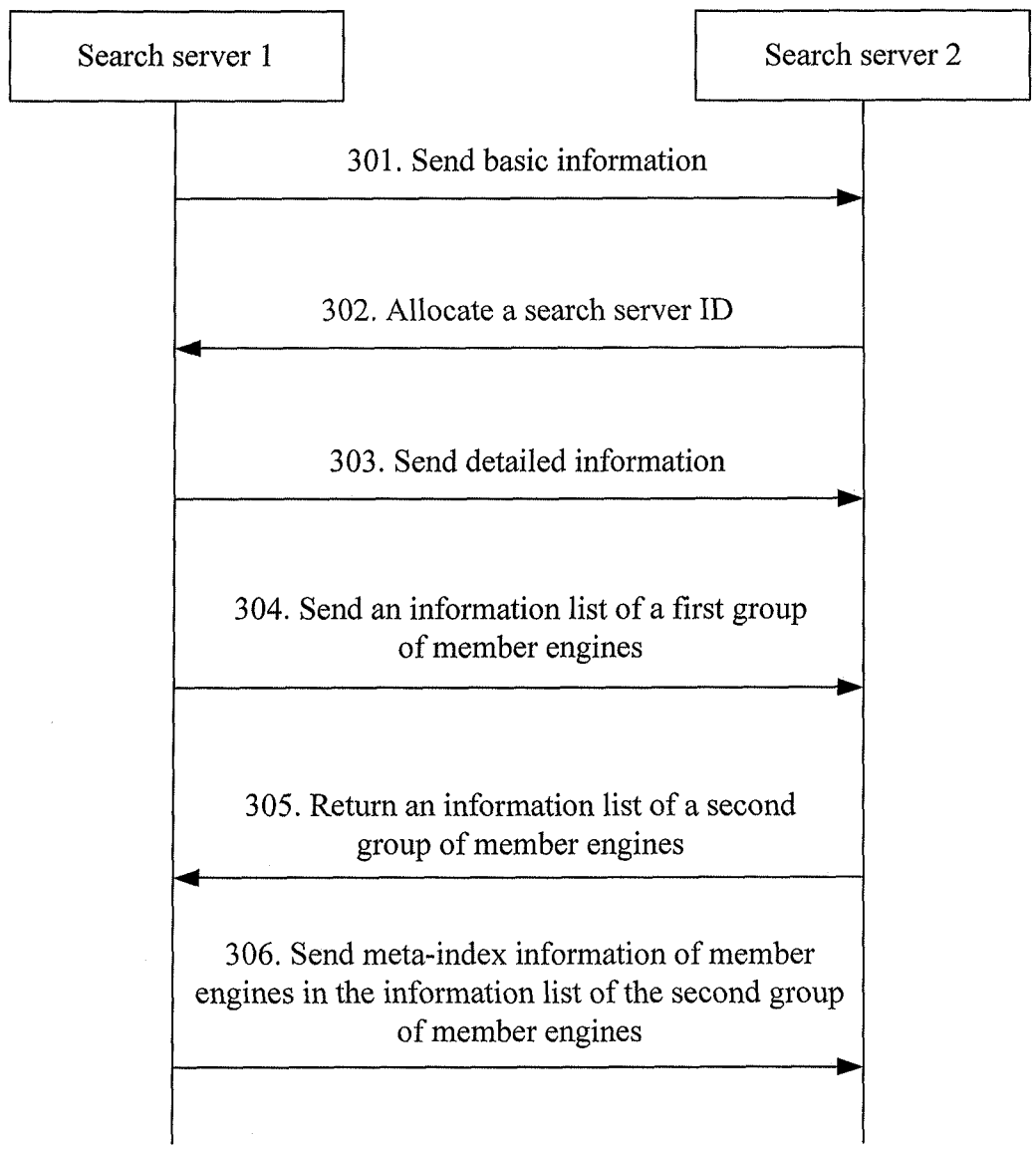
FIG. 3 is a flow chart of a registration procedure of a search server interconnection method for mobile search according to an embodiment of the present invention.

Referring to FIG. 3, this embodiment provides a search server interconnection method for mobile search, which is used in a mobile search system where a search server of a requesting party registers meta-index information of a member engine with a search server of a requested party. The method specifically includes:

301: A search server 1 sends basic information of the search server 1 to a search server 2, and requests for registration.

The search server 1 is a search server of a requesting party, the search server 2 is a search server of a requested party, and the basic information includes, but is not limited to, the name of the search server 1, the URL of the search server 1, a telephone number, an Email address, and a simple description of a function.

302: After receiving the basic information from the search server 1, the search server 2 allocates a search server identifier, that is, an ID, to the search server 1, where the search server identifier is used in a subsequent update procedure in which the search server 2 identifies the search server 1 by means of the identifier.

303: After receiving the identifier sent by the search server 2, the search server 1 submits detailed information of the search server 1 to the search server 2.

The detailed information includes, but is not limited to, one or more types of the following information:

information of a field covered by search of the search server 1, information of a region covered by search of the search server 1, the total number of member engines administrated by the search server 1, an interface of the search server 1 for querying and searching a result, and a mapping relation of attributes in the interface of the search server 1 for querying and searching a result to attributes in an interface of the search server 2 for querying and searching a result.

The various types of information are respectively introduced in the following.

1) Information of a field covered by search of the search server 1

Figure 4:
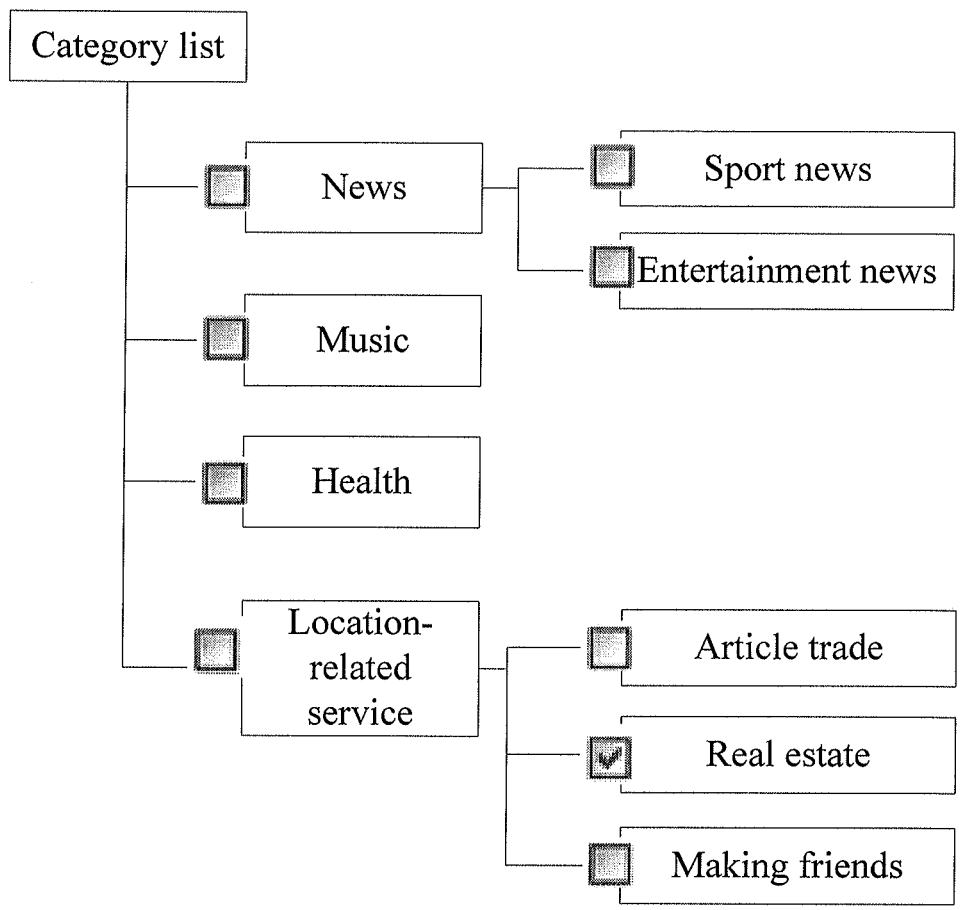
FIG. 4 is a schematic diagram of information of a field covered by a search server according to an embodiment of the present invention.

The information of the field covered by the search of the search server 1 is a search type of the search server 1, a search field in a system for mobile search generally includes a plurality of types, such as, news, music, health, and location-related service, the news may be further categorized into sport news and entertainment news, and the location-related service may be further categorized into services such as article trade, real estate, and making friends. The search server 1 may cover one or more fields of the search field in the system of mobile search. For example, referring to FIG. 4, the search server 1 covers a real estate field.

2) Information of a region covered by search of the search server 1

Figure 5:
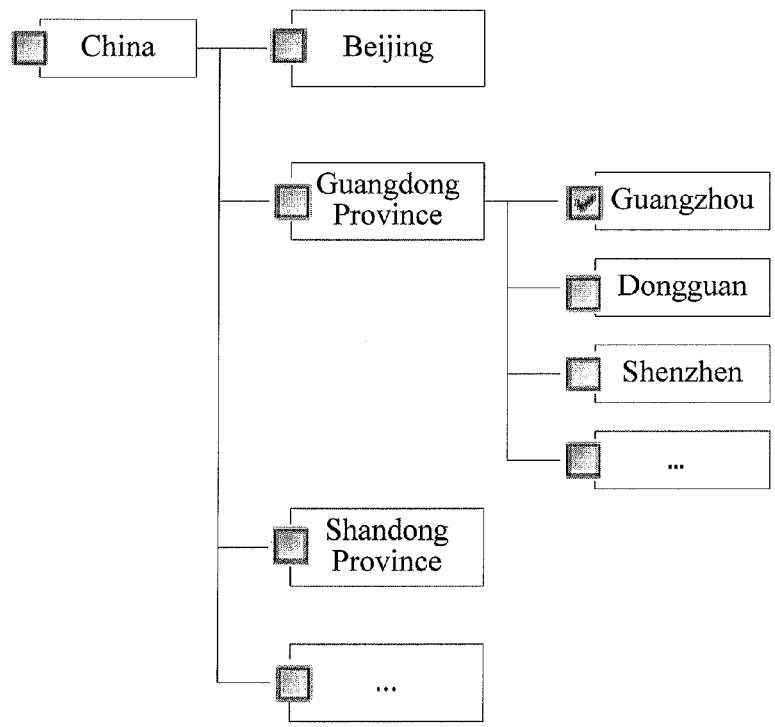
FIG. 5 is a schematic diagram of information of a region covered by a search server according to an embodiment of the present invention.

In a system for mobile search, the information of the region covered by the search includes a plurality of types, and is generally divided with a city as the minimal granularity, for example: China includes: Beijing, Guangdong province, Shandong province and so on, and Guangdong province includes: Guangzhou, Dongguan, Shenzhen and so on. The search server 1 may cover one or more regions. For example, referring to FIG. 5, the search server 1 covers Guangzhou.

3) Total number of member engines administrated by the search server 1

For example, if the search server 1 administrates a member engine Google and a member engine Baidu, the total number of the administrated member engines is 2.

4) Interface schema of the search server 1 for querying and searching a result The interface schema generally includes a plurality of attributes, which is exemplified as follows:

T (an attribute name): a text type field, representing a thesis title, with a label: t;

A (an attribute name): a text type field, representing an author, with a label: a;

D (an attribute name): a text type field, representing a digest, with a label: d;

P (an attribute name): a date type field, representing a publication date, with a label: p; and F (an attribute name): a text type field, representing a full text, with a label: f.

5) Mapping relation of attributes in the interface schema of the search server 1 for querying and searching a result to attributes in an interface schema of the search server 2 for querying and searching a result, which is exemplified as follows:

The interface schema of the search server 2 for querying and searching a result is:

Title (an attribute name): a text type field, representing a thesis name, with a label: ti;

Author (an attribute name): a text type field, representing an author, with a label: au;

Digest (an attribute name): a text type field, representing a digest, with a label: di;

Publication_date (an attribute name): a date type field, representing a publication date, with a label: pd;

Full_text (an attribute name): a text type field, representing a full text, with a label: ft; and Claim (an attribute name): a text type field, representing a claim, with a label: cl.

The mapping relation of attributes in the interface schema of the search server 1 for querying and searching a result to attributes in the interface schema of the search server 2 for querying and searching a result is:

T—Title;
A—Author;
D—Digest;
P—Publication_date; and
F—Full_text.

304: The search server 1 submits an information list of a first group of member engines to the search server 2, where the information list may include one or more member engines, generally, a plurality of member engines.

Specifically, the search server 1 may select, in a member engine range administrated by the search server 1, member engines that are to share a meta-index, and form the information list of the first group of member engines with information of the selected member engines. The administration refers to that the member engine registers with the search server 1 and is administrated by the search server 1. The member engines that are to share a meta-index may be all members or a part of the members in the administrated range. For example, the search server 1 may designate, in the administrated range of ten member engines, five of the ten member engines as member engines that are to share a meta-index.

Information in the information list of the first group of member engines includes, but is not limited to: URLs of the member engines, and descriptions of the member engines.

305: After receiving the information list of the first group of member engines from the search server 1, the search server 2 determines, according to the information list of the first group of member engines, member engines that are to exchange information, and obtains an information list of a second group of member engines and returns the information list of the second group of member engines to the search server 1.

Specifically, the search server 2 may determine, in the information list of the first group of member engines, member engines that satisfy at least one of the following three conditions as the member engines that are to exchange information, thus obtaining the information list of the second group of member engines:

a member engine that is not administrated by the search server 2, a member engine that is useful to the search server 2, and a member engine having a search field in a range of a search field of the search server 2.

The member engine that is not administrated by the search server 2 refers to a new member engine, and this condition may filter and remove a repetitive member engine; a member engine to be added is designated by the search server 2 according to a requirement, for example, a member engine that is regarded as an important member engine by the search server may be designated.

Figure 6:
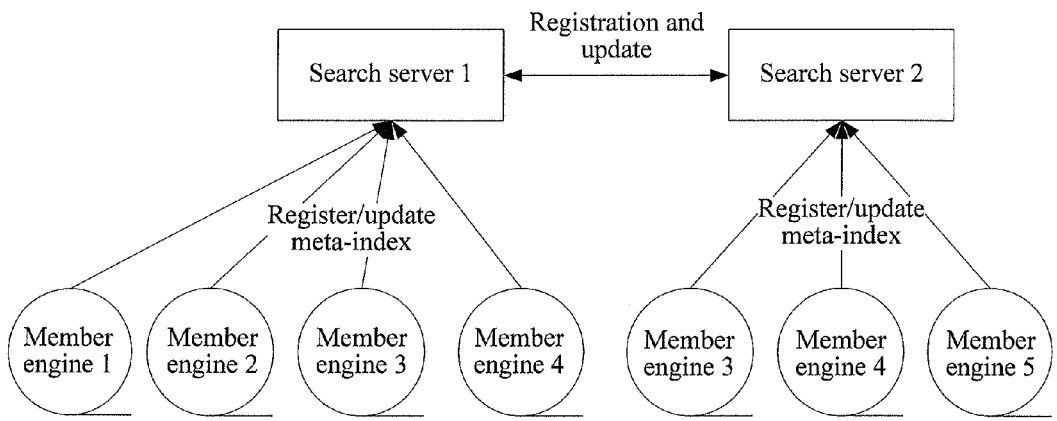
FIG. 6 is a schematic diagram of registration/update between two MSSs according to an embodiment of the present invention.

For example, referring to FIG. 6, if the search server 1 administrates member engines 1 to 4, the information list of the first group of member engines includes the member engines 1 to 4, and if member engines administrated by the search server 2 include member engines 3 to 5, member engines 1 and 2 in the information list of the first group of member engines are member engines that are not administrated by the search server 2, and the search server 2 may form the information list of the second group of member engines with the member engines 1 and 2; or, an important member engine 2 is selected to form the information list of the second group of member engines. If a search field of the member engine 1 is news, a search field of the member engine 2 is real estate, and a search field of the search server 2 includes news and music, the search server 2 may form the information list of the second group of member engines with the member engine 1.

306: After receiving the information list of the second group of member engines from the search server 2, the search server 1 sends meta-index information of member engines in the list of the second group of member engines to the search server 2, and the search server 2 receives and then stores the meta-index information, so as to complete a registration procedure.

In this embodiment, the search server 1 sends an information list, and after being determined by the search server 2, meta-index information of member engines is sent to the search server 2, so that an effective registration across search servers is realized, and the meta-index information of the determined member engines is transferred between the search servers, which greatly reduces a workload and a network bandwidth of the search servers. The search server 1 may determine the information list of the first group of member engines according to an administrated range and a share requirement, and the search server 2 may determine the information list of the second group of member engines according to the preceding three conditions, which is simple and convenient and is easily realized, and has high flexibility and practicability.

Figure 7:
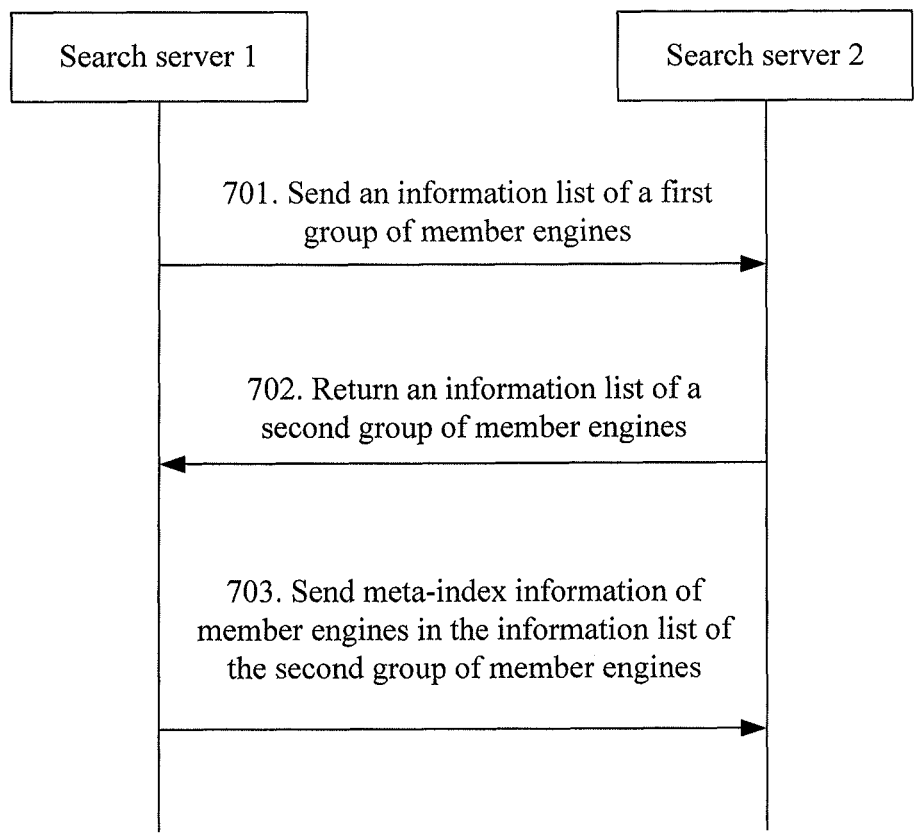
FIG. 7 is a flow chart of a update procedure of a search server interconnection method for mobile search according to an embodiment of the present invention.

Referring to FIG. 7, this embodiment provides a search server interconnection method for mobile search, which is used in a system for mobile search where a search server of a requesting party updates meta-index information of member engines to a search server of a requested party. The method is similar to the preceding registration procedure, the difference lies in that steps 301 to 303 are not needed, and the method is specifically as follows.

701: A search server 1 sends an information list of a first group of member engines to a search server 2, and requests for update.

The information list may include one or more member engines, generally, a plurality of member engines. Information in the information list of the first group of member engines includes, but is not limited to, URLs of the member engines, and descriptions of the member engines.

Specifically, the search server 1 may select, in a member engine range administrated by the search server 1, member engines that are to share a meta-index, and form the information list of the first group of member engines with information of the selected member engines.

702: After receiving the information list of the first group of member engines from the search server 1, the search server 2 determines, according to the information list of the first group of member engines, member engines that are to update information, and obtains an information list of a second group of member engines and returns the information list of the second group of member engines to the search server 1.

Specifically, the search server 2 may determine, in the information list of the first group of member engines, member engines that satisfy at least one of the following three conditions as the member engines that are to update information, thus obtaining the information list of the second group of member engines:

a member engine that is not administrated by the search server 2, a member engine that is useful to the search server 2, and a member engine having a search field in a range of a search field of the search server 2.

703: After receiving the information list of the second group of member engines from the search server 2, the search server 1 sends meta-index information of member engines in the list of the second group of member engines to the search server 2, and the search server 2 receives and then stores the meta-index information, so as to complete an update procedure.

In this embodiment, the search server 1 sends an information list, after being determined by the search server 2, meta-index information of member engines is sent to the search server 2, so that effective update across search servers is realized, and the meta-index information of the determined member engines is transferred between the search servers, which greatly reduces a workload and a network bandwidth of the search servers. The search server 1 may determine the information list of the first group of member engines according to an administrated range and a share requirement, and the search server 2 may determine the information list of the second group of member engines according to the preceding three conditions, which is simple and convenient and is easily realized, and has high flexibility and practicability.

Figure 8:
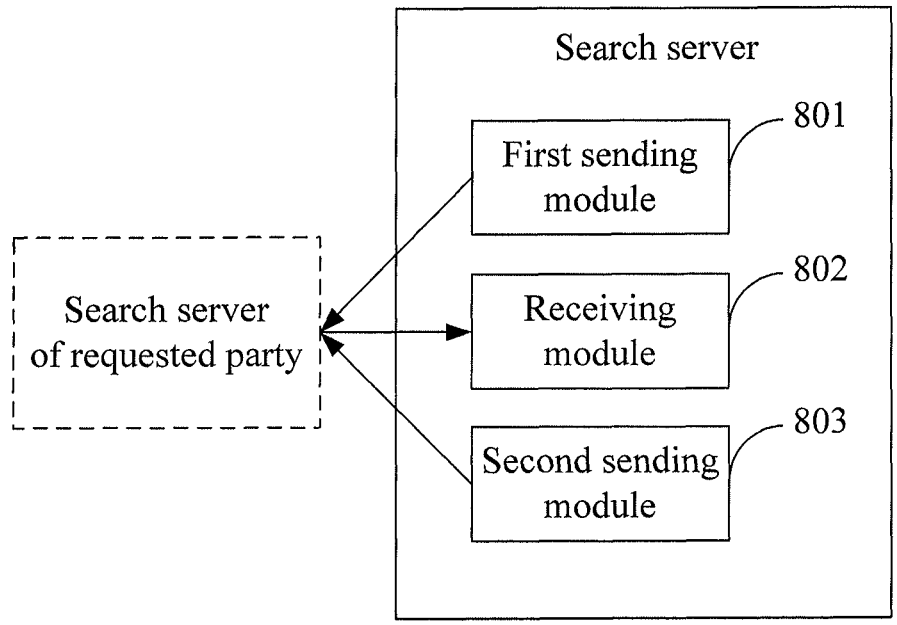
FIG. 8 is a structural diagram of a search server according to an embodiment of the present invention.

Referring to FIG. 8, this embodiment provides a search server for mobile search, which includes:

a first sending module 801, configured to send an information list of a first group of member engines to a search server of a requested party;

a receiving module 802, configured to receive an information list of a second group of member engines, where the information list of the second group of member engines is returned by the search server of the requested party, and the information list of the second group of member engines is obtained after the search server of the requested party determines, according to the information list of the first group of member engines, member engines that are to exchange information; and a second sending module 803, configured to send meta-index information of member engines in the information list of the second group of member engines to the search server of the requested party, where the information list of the second group of member engines is received by the receiving module 802.

Furthermore, the search server may further include:

a generation module, configured to select, in a member engine range administrated by the search server, member engines that are to share a meta-index, before the first sending module 801 sends the information list of the first group of member engines to the search server of the requested party, and form the information list of the first group of member engines with information of the selected member engines.

In this embodiment, the meta-index information is information used for describing a member engine, or information used for describing contents included by a database that is corresponding to the member engine, and the meta-index information is used to index a member engine or a corresponding database in meta-search. The meta-index information includes at least one type of the following information:

a maximum normalized weight of a term, a sum of word frequencies of a term, a document frequency of a term, the number of values within a value interval of a numerical value-type parameter, and a document frequency of a value of an enumeration-type parameter.

The term is any term in a database corresponding to a member engine to which the meta-index information belongs, and both the numerical value-type parameter and the enumeration-type parameter are parameters in the database corresponding to the member engine to which the meta-index information belongs.

In this embodiment, through meta-index information exchange of member engines between search servers, an effective mobile search service across the search servers is realized, and meta-index information of determined member engines is transferred between the search servers, which greatly reduces a workload and a network bandwidth of the search servers.

Figure 9:
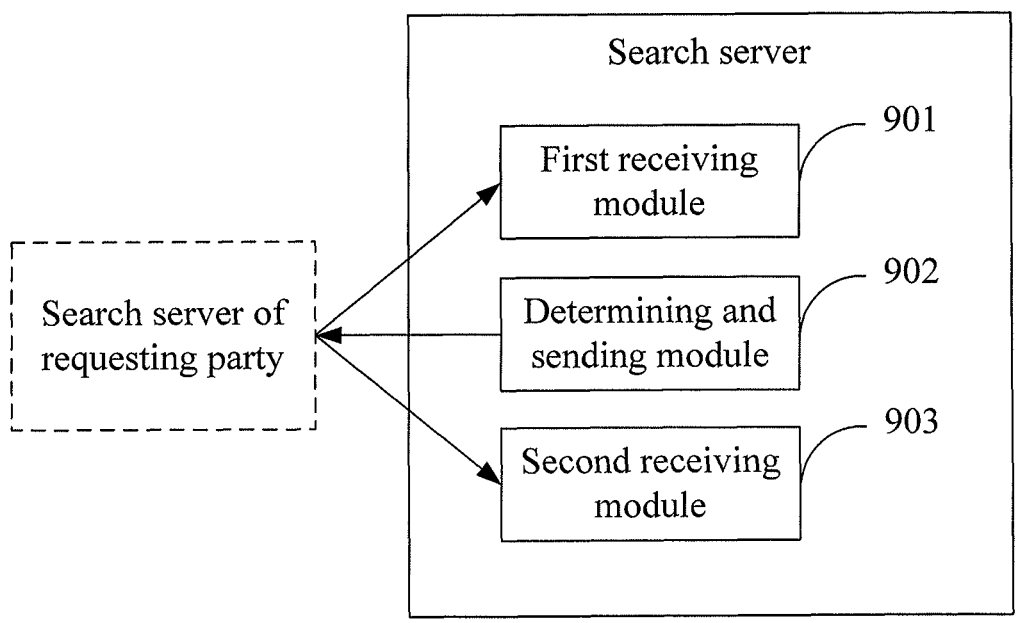
FIG. 9 is another structural diagram of a search server according to an embodiment of the present invention.

Referring to FIG. 9, this embodiment provides a search server for mobile search, which includes:

a first receiving module 901, configured to receive an information list of a first group of member engines, where the information list of the first group of member engines is sent by a search server of a requesting party;

a determining and sending module 902, configured to determine, according to the information list of the first group of member engines, member engines that are to exchange information, where the information list of the first group of member engines is received by the first receiving module 901, obtain an information list of a second group of member engines, and send the information list of the second group of member engines to the search server of the requesting party; and a second receiving module 903, configured to receive meta-index information of member engines in the information list of the second group of member engines, where the information list of the second group of member engines is returned by the search server of the requesting party.

The determining and sending module 902 may specifically include:

a determining unit, configured to determine, in the information list of the first group of member engines, member engines that satisfy at least one of the following three conditions as the member engines that are to exchange information, where the information list of the first group of member engines is received by the first receiving module 901, and obtain an information list of a second group of member engines: a member engine that is not administrated by the search server, a member engine to be added, and a member engine having a search field in a range of a search field of the search server; and a sending unit, configured to send the information list of the second group of member engines to the search server of the requesting party, where the information list of the second group of member engines is obtained by the determining unit.

In this embodiment, the meta-index information is information used for describing a member engine, or information used for describing contents included by a database that is corresponding to the member engine, and the meta-index information is used to index a member engine or a corresponding database in meta-search. The meta-index information includes at least one type of the following information:

a maximum normalized weight of a term, a sum of word frequencies of a term, a document frequency of a term, the number of values within a value interval of a numerical value-type parameter, and a document frequency of a value of an enumeration-type parameter.

The term is any term in a database corresponding to a member engine to which the meta-index information belongs, and both the numerical value-type parameter and the enumeration-type parameter are parameters in the database corresponding to the member engine to which the meta-index information belongs.

In this embodiment, through meta-index information exchange of member engines between search servers, an effective mobile search service across the search servers is realized, and meta-index information of determined member engines is transferred between the search servers, which greatly reduces a workload and a network bandwidth of the search servers.

Figure 10:
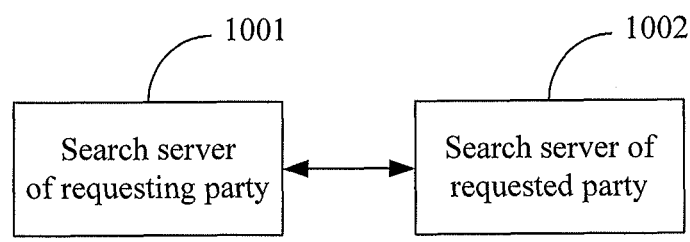
FIG. 10 is a structural diagram of a system for mobile search according to an embodiment of the present invention.

Referring to FIG. 10, this embodiment provides a system for mobile search, which includes a search server of a requesting party 1001 and a search server of a requested party 1002.

The search server of the requesting party 1001 is configured to send an information list of a first group of member engines to the search server of the requested party 1002; receive an information list of a second group of member engines, where the information list of the second group of member engines is returned by the search server of the requested party 1002; and send meta-index information of member engines in the information list of the second group of member engines to the search server of the requested party 1002.

The search server of the requested party 1002 is configured to receive the information list of the first group of member engines, where the information list of the first group of member engines is sent by the search server of the requesting party 1001; determine, according to the information list of the first group of member engines, member engines that are to exchange information; obtain the information list of a second group of member engines; return the information list of the second group of member engines to the search server of the requesting party 1001; and receive meta-index information of member engines in the information list of the second group of member engines, where the information list of the second group of member engines is returned by the search server of the requesting party 1001.

In this embodiment, the meta-index information is information used for describing a member engine, or information used for describing contents included by a database that is corresponding to the member engine, and the meta-index information is used to index a member engine or a corresponding database in meta-search. The meta-index information includes at least one type of the following information:

a maximum normalized weight of a term, a sum of word frequencies of a term, a document frequency of a term, the number of values within a value interval of a numerical value-type parameter, and a document frequency of a value of an enumeration-type parameter.

The term is any term in a database corresponding to a member engine to which the meta-index information belongs, and both the numerical value-type parameter and the enumeration-type parameter are parameters in the database corresponding to the member engine to which the meta-index information belongs.

All or a part of the technical solutions provided in the embodiments of the present invention may be implemented by a program instructing relevant hardware. The program may be stored in a readable storage medium. The storage medium includes any medium that is capable of storing program codes, such as an ROM, an RAM, a magnetic disk, or an optical disk.

The preceding descriptions are merely exemplary embodiments of the present invention, but are not intended to limit the present invention. Any modification, equivalent replacement, or improvement made without departing from the spirit and principle of the present invention shall all fall within the protection scope of the present invention.

What is claimed is:

1. A method for exchanging information about available member engines from a first search server to a second search server for mobile searching, comprising:

sending, by the first search server, a first information list of a first group of member engines to the second search server, wherein each member engine provides a real search service for one or more operator's subscribers and are generally described with meta-index information for indexing therewith;

selecting, by the second search server, from the first information list of the first group of member engines, a second group of member engines that are to exchange information with the second search server;

based on the selected second group of member engines, generating, by the second search server, a second information list of a second group of member engines for requesting meta-index information for indexing to the second group of member engines;

sending, by the second search server, the second information list of the second group of member engines to the first search server;

receiving, by the first search server, the second information list of a second group of member engines; and sending, by the first search server, meta-index information for the member engines in the second information list of the second group of member engines to the second search server for the second search server in subsequent indexing to one or more of the member engines in the second group of member engines.

2. The method according to claim 1, wherein before the sending the first information list of the first group of member engines to the second search server, further comprising:
selecting, by the first search server, within a member engine range administrated by the first search server, member engines that are to share a meta-index, and forming the first information list of the first group of member engines based on information of the selected member engines.

3. The method according to claim 1, wherein a member engine in the second information list of the second group of member engines satisfies at least one of the following three conditions:
a member engine that is not administrated by the second search server, a member engine that is useful to the second search server, and a member engine having a search field in a range of a search field of the second search server.

4. The method according to claim 1, wherein the meta-index information is information used for describing a member engine, or information used for describing contents comprised by a database that is corresponding to the member engine, and the meta-index information is used to index a member engine or a corresponding database in meta-search.

5. The method according to claim 4, wherein the meta-index information comprises at least one type of the following information:
a maximum normalized weight of a term, a sum of word frequencies of a term, a document frequency of a term, the number of values within a value interval of a numerical value-type parameter, and a document frequency of a value of an enumeration-type parameter; and
the term is any term in a database corresponding to a member engine to which the meta-index information belongs, and both the numerical value-type parameter and the enumeration-type parameter are parameters in the database corresponding to the member engine to which the meta-index information belongs.

6. A method for obtaining information about available member engines for mobile searching, comprising:
receiving, from a first search server, a first information list of a first group of member engines, wherein each member engine provides a real search service for one or more operator's subscribers and are generally described with meta-index information for indexing therewith;
selecting, from the first information list of the first group of member engines, a second group of member engines that are to exchange information with a second search server;
based on the selected second group of member engines, generating a second information list of a second group of member engines for requesting meta-index information for indexing to the second group of member engines;
sending the second information list of the second group of member engines to the frist search server; and
receiving, from the first search server, meta-index information for the member engines in the second information list of the second group of member engines for use in subsequent indexing to one or more of the member engines in the second group of member engines.

7. The method according to claim 6, wherein the selecting, from the first information list of the first group of member engines, the second group of member engines that are to exchange information with the second search server specifically comprises:
selecting, by the second search server, from the first information list of the first group of member engines, the second group of member engines that satisfy at least one of the following three conditions as the member engines that are to exchange information:
a member engine that is not administrated by the second search server, a member engine that is useful to the second search server, and a member engine having a search field in a range of a search field of the second search server.

8. The method according to claim 6, wherein the meta-index information is information used for describing a member engine, or information used for describing contents comprised by a database that is corresponding to the member engine, and the meta-index information is used to index a member engine or a corresponding database in meta-search.

9. The method according to claim 8, wherein the meta-index information comprises at least one type of the following information:
a maximum normalized weight of a term, a sum of word frequencies of a term, a document frequency of a term, the number of values within a value interval of a numerical value-type parameter, and a document frequency of a value of an enumeration-type parameter; and
the term is any term in a database corresponding to a member engine to which the meta-index information belongs, and both the numerical value-type parameter and the enumeration-type parameter are parameters in the database corresponding to the member engine to which the meta-index information belongs.

10. A search server for exchanging information about available member engines to a search server of a requested party for mobile searching, comprising:
a first sending module, configured to send a first information list of a first group of member engines to a search server of a requested party, wherein each member engine provides a real search service for one or more operator's subscribers and are generally described with meta-index information for indexing therewith;
a receiving module, configured to receive a second information list of a second group of member engines, wherein the second information list of the second group of member engines is sent by the search server of the requested party, the second group of member engines in the second information list are selected, by the search server of the requested party, from the first information list of the first group of member engines that are to exchange information with the search server of the requested party, and based on the selected second group of member engines, the search server of the requested party generate the second information list of a second group of member engines for requesting meta-index information for indexing to the second group of member engines; and
a second sending module, configured to send meta-index information of member engines in the second information list of the second group of member engines to the search server of the requested party for the search server of the requested party in subsequent indexing to one or more of the member engines in the second group of member engines, wherein the second information list of the second group of member engines is received by the receiving module.

11. The search server according to claim 10, further comprising:
a generation module, configured to: before the first sending module sends the first information list of the first group of member engines to the search server of the requested party, select, in a member engine range administrated by the search server, member engines that are to share a meta-index, and form the first information list of the first group of member engines with information of the selected member engines.

12. The search server according to claim 10, wherein the meta-index information is information used for describing a member engine, or information used for describing contents comprised by a database that is corresponding to the member engine, and the meta-index information is used to index a member engine or a corresponding database in meta-search.

13. The search server according to claim 12, wherein the meta-index information comprises at least one type of the following information:
a maximum normalized weight of a term, a sum of word frequencies of a term, a document frequency of a term, the number of values within a value interval of a numerical value-type parameter, and a document frequency of a value of an enumeration-type parameter; and
the term is any term in a database corresponding to a member engine to which the meta-index information belongs, and both the numerical value-type parameter and the enumeration-type parameter are parameters in the database corresponding to the member engine to which the meta-index information belongs.

14. A search server that communicates with a search server of a requesting party for obtaining information about available member engines for mobile searching, comprising:
a first receiving module, configured to receive a first information list of a first group of member engines from the search server of a requesting party, wherein each member engine provides a real search service for one or more operator's subscribers and are generally described with meta-index information for indexing therewith;
a determining and sending module, configured to select, from the first information list of the first group of member engines, a second group of member engines that are to exchange information; based on the selected second group of member engines, generating a second information list of a second group of member engines for requesting meta-index information for indexing to the second group of member engines; and send the second information list of the second group of member engines to the search server of the requesting party; and
a second receiving module, configured to receive meta-index information for the member engines in the second information list of the second group of member engines for use in subsequent indexing to one or more of the member engines in the second group of member engines, wherein the information list of the second group of member engines is returned by the search server of the requesting party.

15. The search server according to claim 14, wherein the determining and sending module specifically comprises:
a determining unit, configured to select, from the information list of the first group of member engines, the second group of member engines that satisfy at least one of the following three conditions as the member engines that are to exchange information: a member engine that is not administrated by the search server, a member engine that is useful to the search server, and a member engine having a search field in a range of a search field of the search server; based on the selected second group of member engines, generating a second information list of a second group of member engines for requesting meta-index information for indexing to the second group of member engines; and
a sending unit, configured to send the second information list of the second group of member engines to the search server of the requesting party, wherein the second information list of the second group of member engines is obtained by the determining unit.

16. The search server according to claim 14, wherein the meta-index information is information used for describing a member engine, or information used for describing contents comprised by a database that is corresponding to the member engine, and the meta-index information is used to index a member engine or a corresponding database in meta-search.

17. The search server according to claim 16, wherein the meta-index information comprises at least one type of the following information:
a maximum normalized weight of a term, a sum of word frequencies of a term, a document frequency of a term, the number of values within a value interval of a numerical value-type parameter, and a document frequency of a value of an enumeration-type parameter; and
the term is any term in a database corresponding to a member engine to which the meta-index information belongs, and both the numerical value-type parameter and the enumeration-type parameter are parameters in the database corresponding to the member engine to which the meta-index information belongs.

18. A system for mobile search, comprising: a search server of a requesting party and a search server of a requested party, wherein
the search server of the requesting party is configured to send a first information list of a first group of member engines to the search server of the requested party, wherein each member engine provides a real search service for one or more operator's subscribers and are generally described with meta-index information for indexing therewith; receive a second information list of a second group of member engines, wherein the second information list of the second group of member engines is returned by the search server of the requested party; and send meta-index information of member engines in the second information list of the second group of member engines to the search server of the requested party for the search server of the requested party in subsequent indexing to one or more of the member engines in the second group of member engines; and
the search server of the requested party is configured to receive the first information list of the first group of member engines; select, from the first information list of the first group of member engines, the second group of member engines that are to exchange information with the second search server; based on the selected second group of member engines, generate the second information list of a second group of member engines for requesting meta-index information for indexing to the second group of member engines; send the second information list of the second group of member engines to the search server of the requesting party; and receive meta-index information for the member engines in the second information list of the second group of member engines for use in subsequent indexing to one or more of the member engines in the second group of member engines.

19. The system according to claim 18, wherein the meta-index information is information used for describing a member engine, or information used for describing contents comprised by a database that is corresponding to the member engine, and the meta-index information is used to index a member engine or a corresponding database in meta-search.

20. The system according to claim 19, wherein the meta-index information comprises at least one type of the following information:
- a maximum normalized weight of a term, a sum of word frequencies of a term, a document frequency of a term, the number of values within a value interval of a numerical value-type parameter, and a document frequency of a value of an enumeration-type parameter; and
- the term is any term in a database corresponding to a member engine to which the meta-index information belongs, and both the numerical value-type parameter and the enumeration-type parameter are parameters in the database corresponding to the member engine to which the meta-index information belongs.

* * * * *